July 11, 1933.  B. L. BLOCHOWIAK  1,918,081
MILK PASTEURIZING APPARATUS
Filed Feb. 15, 1930   2 Sheets-Sheet 1
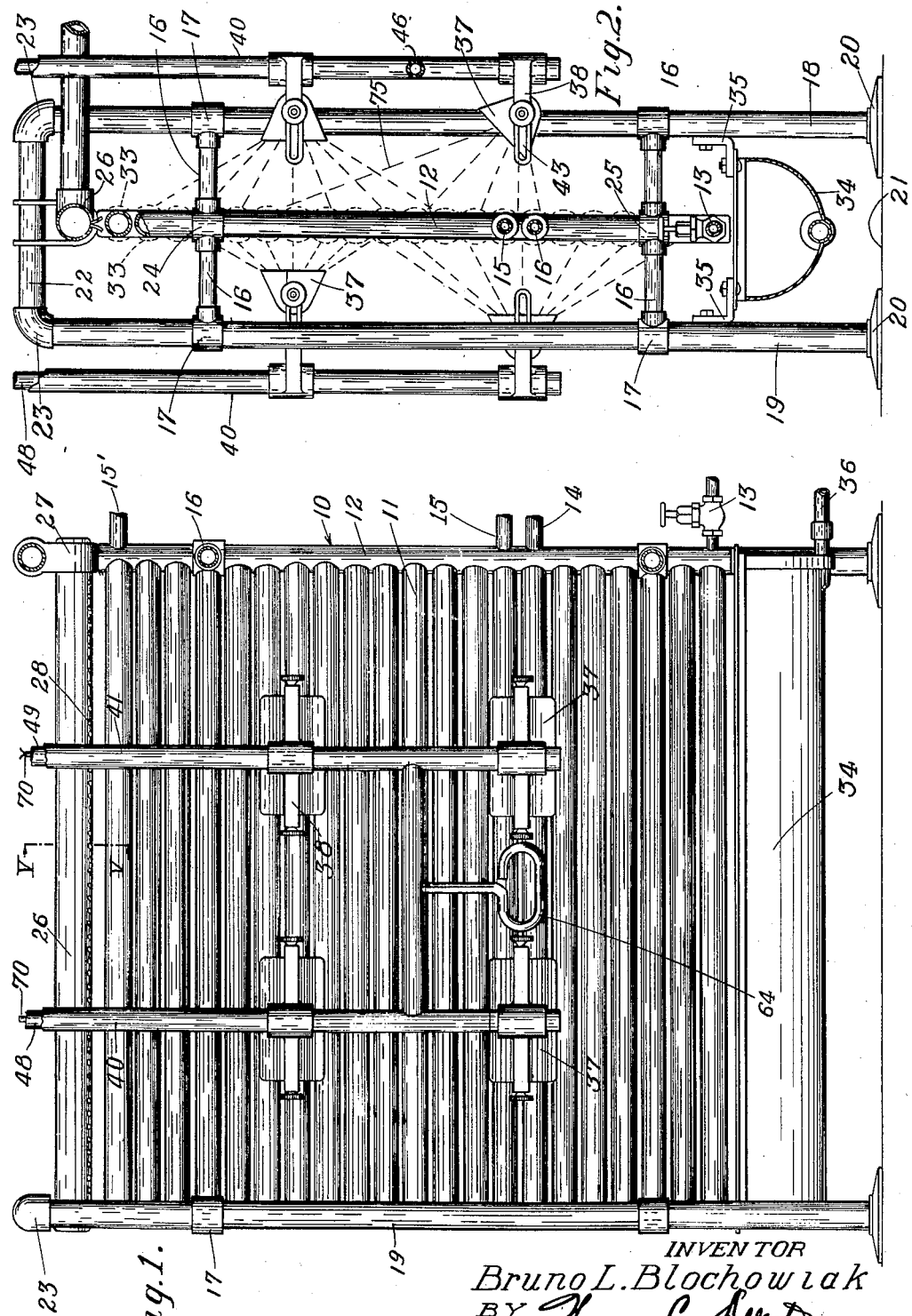
INVENTOR
Bruno L. Blochowiak
BY Harry C. Aberts
ATTY.

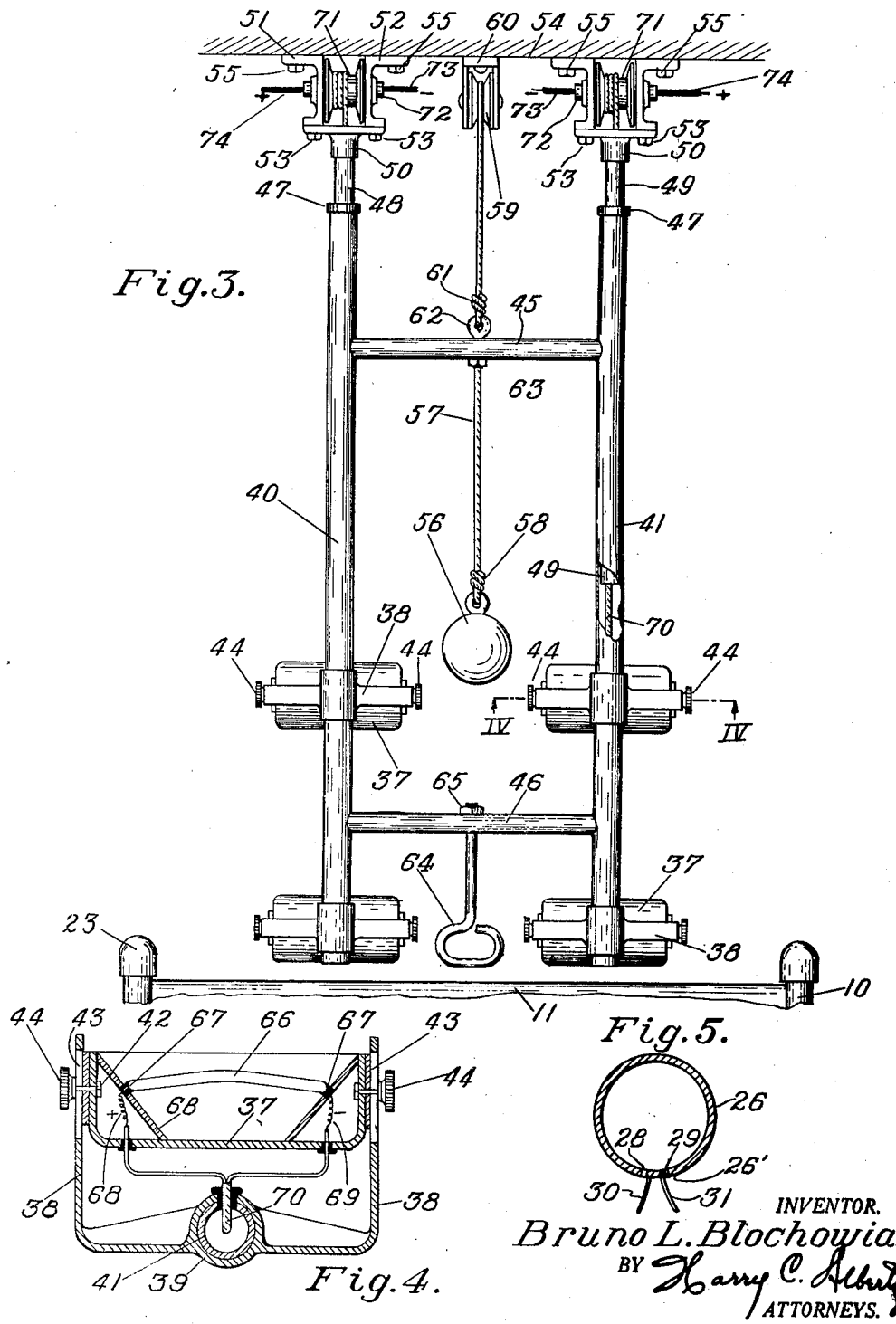

Patented July 11, 1933

1,918,081

UNITED STATES PATENT OFFICE

BRUNO L. BLOCHOWIAK, OF MILWAUKEE, WISCONSIN

MILK PASTEURIZING APPARATUS

Application filed February 15, 1930. Serial No. 428,604.

This invention relates to means for pasteurizing liquids and more particularly to apparatus for subjecting milk to bacteria reducing or eliminating rays, although certain features thereof may be employed with equal advantage for other purposes.

It contemplates more especially the provision of means for subjecting an expansive film of liquid to the effect of ultra violet or other bacteria reducing rays in large quantities without interfering or retarding the commercial processing thereof such as milk in the conversion from its raw state to an edible product conforming to the sanitation and food laws.

In order to effect the pasteurization of fluids ordinarily opaque to the passage of ultra violet rays, it is necessary or at least highly desirable to expose such liquids to the action of rays in films or sheets to afford complete or very substantial transparency. It has heretofore been recognized that liquids must be exposed to such rays in thin films at a certain definite and determined rate as well as temperature. In order to effect pasteurization with maximum efficiency for commercial utilization of such a pasteurizing medium, the production of the resulting product must not be materially diminished or in the least impaired by the peculiar action thereon of rays when prolonged beyond a certain predetermined exposure.

To render this process practicable and useful, it is essential that the temperature of the fluid be maintained within the cooling range to discourage as well as preclude bacteria cultivation. Moreover, the processing of liquids such as milk must not be hampered in the least during the subjection thereof to the rays having a pasteurizing effect, since it would be almost impossible to resort to this medium in commercial plants owing to substantial interference with the production of milk for distribution to the consumer. With known devices, liquids are pasteurized by resort to the ultra violet or other bacteria reducing rays; however, the production thereof is so limited as to render such commercially prohibitive in milk pasteurization plants.

One object of the present invention is to simplify the structure and improve the operation of devices of the character mentioned.

Another object is the provision of means for distributing liquids in an expansive thin film for subjection to ultra violet or other bacteria reducing rays without impairing the production of the resulting product or limiting the capacity thereof.

Still another object is the provision of means for distributing milk in an expansive thin film for cooling and simultaneous ultra violet ray subjection so as to preclude the impairment of liquids owing to the natural effect of such rays thereon.

A further object is the provision of means for adjustably mounting ultra violet ray generating means for subjecting milk or other liquids thereto while distributed in a thin expansive film over a cooling unit.

A still further object is the provision of an ultra violet or other ray producing means in combination with a cooling condenser of known construction so as to effect pasteurization without fluid impairment ordinarily resulting from heat and other destructive ray effects.

Still a further object is the provision of an adjustable mount for ultra violet or other ray generating means movable for positioning within and without the confines of a cooling unit to enable access thereto for cleansing purposes.

An additional object is to provide a rapidly moving expansive liquid film of such thinness which will impart substantially complete transparency to the effects of ultra violet or other bacteria reducing rays so as to effect pasteurization without retarding production.

Other objects and advantages will appear from the following description of an illustrative embodiment of the present invention.

In the drawings:

Figure 1 is a front view of a device embodying features of the present invention.

Figure 2 is an end view of the device shown in Figure 1, parts thereof being broken away to clarify the showing.

Figure 3 is a fragmentary front view of the device shown in Figure 1 with the ray generating mounts in their extreme elevated position beyond the area of the condenser to enable complete access thereto.

Figure 4 is a sectional view of an ultra violet ray generating lamp taken substantially along line IV—IV of Figure 3.

Figure 5 is a sectional view of the distributor taken substantially along line V—V of Figure 1.

The structure selected for illustration comprises a cooling condenser 10 which presents a horizontal series of superimposed pipes 11 bridging vertical tubular standards 12 constituting end headers in communication therewith to define a tortuous path for a cooling medium. The cooling medium may be ammonia or other known refrigerants which circulate therethrough between an expansion valve intake 13 and an outlet 14 in any suitable or customary manner, there being a water inlet 15 in conjunction therewith to accomplish cooling in the manner practiced in the art. The headers 12 are vertically supported by means of cross members, in this instance vertically spaced pipes 16 which terminate in a T-coupling 17 for secural to end standards 18 and 19.

The end standards 18 and 19 comprise, in this instance, vertically disposed pipes which terminate at their lower extremity in flanges bases 20 for attachment to the floor 21 of a structure. The other extremities of the vertical standards 18 and 19 are connected with a transverse pipe 22 by resort to elbows 23, thereby defining an inverted U-shaped end standard bridged by the cross members 16 at spaced intervals. In order to sustain the headers 12 with the brine or other refrigerant circulated pipes 11 disposed transversely therebetween, suitably threaded unions 24 and 25 are secured to the headers 12 to afford threaded engagement with the cross members 16. In consequence thereof, the horizontal series of superimposed pipes 11 are supported in vertical alignment so as to afford a tortuous path for a brine solution which circulates therethrough, thereby cooling the exterior surfaces of the pipes 11 which serve as a cooling medium for liquids passing thereover.

In order to effect the passage or traverse of a liquid over the pipes 11 for cooling purposes, a distributor 26 is supported above the pipes 11 in parallel alignment therewith for support by clamps 27 which embrace the ends thereof for connection to the cross pipes 22 of the end standards 18—19. As a result, the distributor 26, in this instance constituting a tubular pipe somewhat larger in diameter than the brine circulated pipes 11 of the cooling unit 10, affords a means of distribution from a source of fluid supply owing to a spaced series of apertures 28 and 29 provided therein longitudinally thereof over the entire extent of the pipes 11. As shown, the series of apertures 28 and 29 are inclined for divergence in the vicinity of the distributor bottom 26′, thereby tending to discharge the fluid on both sides of the pipes 11 for gravity flow thereover.

In order that the fluid such as milk may be distributed for downward flow over the entire length of the pipes 11 in a continuous expansive film of such thinness as to afford complete or substantial transparency, a pair of arcuate plates 30 and 31 are adhesively or otherwise adjoined for convergence along the bottom median line 32 of the distributor pipe 26 between the spaced series of inclined apertures 28 and 29. In consequence thereof, the milk or other fluid will issue from the apertures 28 and 29 for discharge to the arcuate plates 30 and 31 which terminate within the confines of the pipes 11 to direct the milk over both sides thereof for more or less rapid downward flow in a thin continuous expansive film 33 for ultimate discharge to an arcuate trough 34 supported beneath the lowermost pipe 11 by the end standards 18—19 owing to brackets 35. A pipe 36 communicates with the trough 34 so as to conduct the liquid such as milk therefrom to tanks or bottling machines as commercial practice may dictate.

With the arrangement of parts above described it will be apparent that milk or other liquids directed from a source of supply to a distributor 26 will be discharged over the pipe 11 of the cooling unit 10 in the form of a continuous expansive film of such thinness as to afford transparency to ultra violet or other bacteria reducing rays. This is effected with mass production so that a large volume of milk or other liquid may be directed along a predetermined path for commercial processing for subjection with unlimited capacity to ultra violet rays in a manner which will appear more fully hereinafter.

In order to subject the continuous expansive moving film of milk or other liquid to the effects of ultra violet or other bacteria reducing rays, lamp casings 37, in this instance four, are mounted on each side of the cooling unit 10 for vertically spaced support in furcated brackets 38 which terminate in a central boss 39 for attachment to vertically extending tubular members 40 and 41. As shown, the lamp casings 37 are provided with laterally extending studs 42 which project through the side walls thereof in axial alignment for extension through elongated slots 43 provided in the furcated bracket 38. Knurled knobs 44 threadedly engage the studs 42 so as to enable the casing 37 to be pivotally adjusted in any position within the limits of the slots 43 for positioning at any desirable distance from the cooling unit 10.

As shown, the tubular members 40 and 41 each carry two lamp casings 37 at spaced vertical distance corresponding with the central area of the cooling pipes 11, they being connected for fixed spaced relation by means of cross bars 45 and 46 joined therewith proximate to the extremities thereof. As shown, the tubular members 40 and 41 extend vertically upward for termination in beaded or otherwise reinforced peripheral extremities 47 for telescopic reception of correspondingly spaced tubular members 48 and 49, respectively. The tubular members 48 and 49 terminate in flanged bosses 50 for attachment to spaced angle irons 51 and 52 by means of threaded studs or other suitable fasteners 53. The angle irons 51 and 52, in turn, are fastened to the ceiling or a cross beam 54 of a building structure owing to fasteners 55, thereby supporting the depending tubular rods 48 and 49 in fixed spaced relation in axial alignment with the tubular lamp mounts 40 and 41, respectively, for telescopic association therewith.

In order to maintain the lamp mounts 40 and 41 in any desired or adjusted vertical position, a weight 56 of any suitable form and possessed of a mass sufficient to counterbalance the lamp mounts 40—41, is operatively connected thereto by means of a rope or other tension transmitting member 57. The rope 57 is secured to the weight 56 at one extremity 58 thereof for support over a pulley or sheave 59 rotatively mounted in a furcated bracket 60 fixed to the ceiling or cross beam 54 intermediate the tubular mounts 40—41. The other extremity 61 of the rope 57 is connected to a looped stud 62 which projects through the cross bar 45 for attachment by means of a threaded nut 63, thereby counterbalancing the lamp mount 40—41 in any vertical position between the limits of the telescopically received depending rods 48 and 49. A handle 64 is secured to the cross bar 46 by means of a nut 65 in threaded engagement with the extremity thereof so as to enable the manual manipulation of the mount 40—41 to bring the lamp casings 37 in any position within the confines of the cooling unit 10 or removed entirely thereabove to enable access thereto for cleansing purposes.

As shown, the lamp casing 37 is provided with a mercury arc tube 66 suspended between electrodes 67 carried by a conical or other shaped reflector 68 fixed to the interior of the casing 37 in any suitable manner. In order to energize the mercury arc tube 66 from any suitable source of electrical energy, wires 68 and 69 lead from the electrodes 67 through the casing 37 for extension within the tubular members 40 and 41 which houses the wire receiving conduit 70. Conduits 70 extend within the tubular mounts 40—41 for axial extension through the depending members 48 and 49, respectively, to enable the winding thereof upon sheaves or pulleys 71 rotatively mounted on shafts 72 supported between the angle irons 51 and 52, thereby holding the conduit 70 taut in all vertical positions or during the movement of the mount 40—41. To this end the sheaves or pulleys 71 are provided with springs in the customary manner so as to effect self-winding responsive to the descent of the mount 40—41 and to coil the conduit 70 thereon incident to the ascent thereof. Wires 73 and 74 are connected to the sheaves 71 in any suitable manner to energize the conduit 70 regardless of the movement or position thereof, thereby conducting the electrical energy to the lamps 37 in all positions thereof and as well as during the movement of the mount 40—41.

It is to be noted that the lamp casings 37 are capable of pivotal adjustment so that the ultra violet or other bacterial reducing rays 75 may be directed at any angle and against any predetermined or selected cooling unit area, thereby arranging for the most effective subjection of the thin fluid film 33 descending therealong in any predetermined path. Moreover, the slots 43 in the furcated brackets 38 enable the movement of the casings 37 toward or away from the pipes 11 of the cooling unit 10 so as to adjust and control the penetration power of the rays 75. The ascent or descent of the mount 40—41 determines the position of ray subjection with respect to the upper and lower limits of the cooling unit 10, thereby affording universal adjustment to meet all conditions and requirements of commercial practice. It is to be noted that with the complete elevation of the mount 40—41 (Figure 3), the lamps 37 are removed to a position above the cooling unit 10 to enable complete access thereto for cleansing or other purposes as conditions may require from time to time.

With the combination of elements described, it is apparent that ray producing or generating devices may be employed in connection with standard cooling units so as to pasteurize milk or other liquids on a commercial basis without impairing or retarding the mass production required in modern practice. Moreover, the direction of rays on the cooling unit precludes impairment of the milk or other fluids owing to the evolution of heat incident to ray generation or by the peculiar action thereon of the gases evolved near the electrodes of burning lamps of this character.

Various changes may be made in the embodiment of the invention herein specifically described without departing from or sacrificing any of the advantages of the invention as defined in the appended claims.

I claim:

1. The combination with means for distributing liquids in a thin expansive film along a predetermined path, of a ray generating mount proximate to said path of liquid traverse, means for guiding said mount vertically in parallelism with said liquid distributing means, bacteria reducing ray generating means associated with said mount, and means for displacing said mount from said distributing means to enable access thereto.

2. The combination with means for distributing liquids in a thin expansive film along a predetermined path, of a ray generating mount proximate to said path of liquid traverse, bacteria reducing ray generating means associated with said mount, of members for telescopic association with said mount, and counter-balancing means for maintaining said mount in any vertical adjusted position within the limits of said depending members.

3. The combination with means for distributing liquids in a thin expansive film along a predetermined path, of a ray generating mount proximate to said path of liquid traverse, bacteria reducing ray generating means associated with said mount, of members for telescopic association with said mount, counter-balancing means for maintaining said mount in any vertical adjusted position within the limits of said depending members, and electrical wires extending through said depending members and mount for electrical connection to said ray generating means in all positions of said mount.

4. The combination with means for distributing liquids in a thin expansive film along a predetermined path, of a ray generating mount proximate to said path of liquid traverse, bacteria reducing ray generating means associated with said mount, of members for telescopic association with said mount, counter-balancing means for maintaining said mount in any vertical adjusted position within the limits of said depending members, electrical wires extending through said depending members and mount for electrical connection to said ray generating means, and self-winding reels for maintaining said wires taut in all positions of said mount.

In witness whereof I subscribe my name.

BRUNO L. BLOCHOWIAK.